US010425447B2

(12) United States Patent
Rogers et al.

(10) Patent No.: US 10,425,447 B2
(45) Date of Patent: *Sep. 24, 2019

(54) INCIDENT RESPONSE BUS FOR DATA SECURITY INCIDENTS

(71) Applicant: International Business Machines Corporation, Armonk, NY (US)

(72) Inventors: Kenneth Allen Rogers, Stow, MA (US); Allen Hadden, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,304

(22) Filed: Aug. 28, 2015

(65) Prior Publication Data

US 2017/0063926 A1  Mar. 2, 2017

(51) Int. Cl.
*H04L 29/06* (2006.01)
*G06F 21/60* (2013.01)

(52) U.S. Cl.
CPC ............ *H04L 63/20* (2013.01); *G06F 21/60* (2013.01); *H04L 63/1425* (2013.01)

(58) Field of Classification Search
CPC ...... H04L 63/20; H04L 63/1425; G06F 21/60
See application file for complete search history.

(56) References Cited

U.S. PATENT DOCUMENTS

| 6,678,827 | B1 | 1/2004 | Rothermel et al. |
| 7,114,005 | B2* | 9/2006 | McDaniel ......... H04L 29/12009 |
| | | | 709/245 |
| 7,376,969 | B1 | 5/2008 | Njemanze et al. |
| 7,472,422 | B1* | 12/2008 | Agbabian ............. H04L 41/06 |
| | | | 726/25 |
| 7,562,369 | B1* | 7/2009 | Salamone ............... G06F 9/54 |
| | | | 719/328 |
| 7,877,804 | B2 | 1/2011 | Khanolkar et al. |

(Continued)

OTHER PUBLICATIONS

Hadden et al., U.S. Appl. No. 14/743,399, filed Jun. 18, 2015.

(Continued)

*Primary Examiner* — David Garcia Cervetti
(74) *Attorney, Agent, or Firm* — Jeffrey S. LaBaw; David H. Judson

(57) ABSTRACT

A system and method for responding to data security incidents in enterprise networks using an incident response bus (IR bus) within an incident management system is disclosed. An Incident Manager (IM) application of the system stores objects that include information concerning data security incidents that occur in enterprise networks managed by the incident management system. Users configure action conditions on the IM, the satisfaction of which cause the IM to send messages that include the information concerning the incidents to message queues, or destinations. Correspondingly, the IR bus includes plugins associated with the devices in each client's enterprise network, where each plugin can access the message destinations for the messages. The plugins, in one embodiment, also configure one or more chains of plugins that process the messages. The plugins then execute the chains of plugins to specify actions for the devices to execute to provide a response to the incidents.

19 Claims, 5 Drawing Sheets

(56) References Cited

U.S. PATENT DOCUMENTS

| | | | |
|---|---|---|---|
| 7,940,756 B1* | 5/2011 | Duffy | H04L 41/50 370/235 |
| 8,032,557 B1 | 10/2011 | Vijendra et al. | |
| 8,201,191 B2* | 6/2012 | Ladd | H04L 63/10 709/229 |
| 8,244,777 B1 | 8/2012 | Vijendra et al. | |
| 8,661,062 B1 | 2/2014 | Jamail et al. | |
| 8,707,445 B2 | 4/2014 | Sher-Jan et al. | |
| 8,763,133 B2 | 6/2014 | Sher-Jan et al. | |
| 8,782,784 B1 | 7/2014 | Bruskin | |
| 8,880,682 B2 | 11/2014 | Bishop et al. | |
| 8,918,867 B1* | 12/2014 | Salour | G06F 21/6245 726/22 |
| 9,069,930 B1 | 6/2015 | Hart | |
| 9,075,668 B1 | 7/2015 | Hushon et al. | |
| 9,083,734 B1 | 7/2015 | Bishop et al. | |
| 9,152,706 B1 | 10/2015 | Claudatos et al. | |
| 9,215,270 B2 | 12/2015 | Mohaban et al. | |
| 9,258,321 B2 | 2/2016 | Amsler et al. | |
| 9,338,181 B1* | 5/2016 | Burns | H04L 63/1433 |
| 9,705,922 B2* | 7/2017 | Foxhoven | H04L 63/20 |
| 9,819,550 B2* | 11/2017 | Mann | H04W 4/24 |
| 2002/0078263 A1* | 6/2002 | Darling | G06F 9/5061 719/331 |
| 2002/0087882 A1* | 7/2002 | Schneier | G06F 21/552 726/23 |
| 2004/0098623 A1* | 5/2004 | Scheidell | G06F 21/552 726/23 |
| 2005/0091068 A1* | 4/2005 | Ramamoorthy | H04L 41/022 709/203 |
| 2005/0176507 A1* | 8/2005 | Ephrati | G06Q 50/34 463/39 |
| 2006/0092861 A1* | 5/2006 | Corday | H04L 41/0213 370/256 |
| 2006/0095968 A1* | 5/2006 | Portolani | H04L 63/0218 726/23 |
| 2006/0161816 A1* | 7/2006 | Gula | H04L 41/065 714/39 |
| 2007/0067848 A1* | 3/2007 | Gustave | G06F 21/577 726/25 |
| 2007/0103324 A1* | 5/2007 | Kosuge | E03F 7/00 340/618 |
| 2007/0186284 A1* | 8/2007 | McConnell | G06F 21/55 726/25 |
| 2007/0240197 A1* | 10/2007 | Blumenthal | H04L 63/0227 726/1 |
| 2007/0276941 A1* | 11/2007 | Yodaiken | G06F 9/45537 709/224 |
| 2008/0189774 A1* | 8/2008 | Ansari | G06Q 30/04 726/7 |
| 2008/0229419 A1* | 9/2008 | Holostov | G06F 21/564 726/24 |
| 2008/0229422 A1* | 9/2008 | Hudis | G06F 21/552 726/25 |
| 2008/0244034 A1* | 10/2008 | Shannon | H04L 67/08 709/217 |
| 2009/0065572 A1* | 3/2009 | Jain | G06K 19/07739 235/379 |
| 2009/0164522 A1* | 6/2009 | Fahey | H04L 63/1441 |
| 2009/0178132 A1* | 7/2009 | Hudis | G06F 21/55 726/12 |
| 2009/0222924 A1* | 9/2009 | Droz | H04L 63/1425 726/24 |
| 2009/0254392 A1* | 10/2009 | Zander | G06F 21/6218 705/50 |
| 2009/0254970 A1* | 10/2009 | Agarwal | G06F 21/554 726/1 |
| 2010/0046378 A1* | 2/2010 | Knapp | H04L 41/0604 370/242 |
| 2010/0058432 A1* | 3/2010 | Neystadt | G06F 21/57 726/1 |
| 2010/0179674 A1* | 7/2010 | Willard | G10H 1/0025 700/94 |
| 2011/0039237 A1* | 2/2011 | Skare | G05B 23/0267 434/118 |
| 2011/0126111 A1* | 5/2011 | Gill | G06F 21/55 715/736 |
| 2011/0131324 A1* | 6/2011 | Chaturvedi | H04L 63/20 709/225 |
| 2012/0188072 A1* | 7/2012 | Dawes | G06Q 50/06 340/514 |
| 2012/0210158 A1* | 8/2012 | Akiyama | G06F 21/554 714/2 |
| 2012/0224057 A1* | 9/2012 | Gill | G06F 21/55 348/143 |
| 2013/0124223 A1 | 5/2013 | Gregg | |
| 2013/0179244 A1* | 7/2013 | Laffoon | H04L 63/0823 705/14.23 |
| 2013/0212683 A1* | 8/2013 | Sher-Jan | G06F 21/00 726/25 |
| 2013/0291087 A1* | 10/2013 | Kailash | H04L 63/1425 726/11 |
| 2013/0305340 A1* | 11/2013 | Wotring | H04L 63/1416 726/11 |
| 2013/0305357 A1* | 11/2013 | Ayyagari | H04W 12/06 726/22 |
| 2013/0332590 A1 | 12/2013 | Mohaban et al. | |
| 2014/0053265 A1* | 2/2014 | Crowley | H04L 43/12 726/22 |
| 2014/0068769 A1* | 3/2014 | Neil | H04L 63/1433 726/23 |
| 2014/0201836 A1* | 7/2014 | Amsler | H04L 63/1425 726/23 |
| 2014/0245423 A1* | 8/2014 | Lee | H04L 63/0218 726/12 |
| 2014/0245439 A1* | 8/2014 | Day | G06F 21/552 726/23 |
| 2014/0259095 A1* | 9/2014 | Bryant | H04L 63/20 726/1 |
| 2014/0259170 A1* | 9/2014 | Amsler | H04L 63/20 726/23 |
| 2014/0278664 A1 | 9/2014 | Loomis | |
| 2014/0283075 A1* | 9/2014 | Drissel | H04L 63/1433 726/23 |
| 2014/0304822 A1 | 10/2014 | Sher-Jan et al. | |
| 2014/0310243 A1* | 10/2014 | McGee | G06Q 10/101 707/639 |
| 2015/0009038 A1* | 1/2015 | Trossbach, Jr. | G08B 5/22 340/691.6 |
| 2015/0082432 A1* | 3/2015 | Eaton | H04L 47/785 726/23 |
| 2015/0085994 A1* | 3/2015 | Koyabe | H04M 3/08 379/1.03 |
| 2015/0113663 A1 | 4/2015 | Sher-Jan et al. | |
| 2015/0163121 A1* | 6/2015 | Mahaffey | G06F 11/0766 707/687 |
| 2015/0163199 A1* | 6/2015 | Kailash | H04L 63/0209 726/11 |
| 2015/0172321 A1* | 6/2015 | Kirti | H04L 63/20 726/1 |
| 2015/0235164 A1 | 8/2015 | Key | |
| 2015/0237061 A1* | 8/2015 | Shraim | H04L 63/1425 726/22 |
| 2015/0242625 A1 | 8/2015 | Cassidy et al. | |
| 2015/0264072 A1* | 9/2015 | Savchuk | H04L 43/026 726/23 |
| 2015/0347751 A1* | 12/2015 | Card | H04L 63/20 726/23 |
| 2015/0365438 A1* | 12/2015 | Carver | H04L 63/1441 726/1 |
| 2016/0021133 A1* | 1/2016 | Sher-Jan | H04L 63/1433 726/25 |
| 2016/0044061 A1* | 2/2016 | Forte | H04L 63/20 715/713 |
| 2016/0072836 A1* | 3/2016 | Hadden | H04L 63/1441 726/23 |

(56) References Cited

U.S. PATENT DOCUMENTS

| | | | | |
|---|---|---|---|---|
| 2016/0127394 | A1* | 5/2016 | Hadden | H04L 63/1408 726/23 |
| 2016/0127417 | A1* | 5/2016 | Janssen | H04L 63/20 726/1 |
| 2016/0149769 | A1* | 5/2016 | Joshi | H04L 41/5006 715/739 |
| 2016/0164919 | A1* | 6/2016 | Satish | G06F 16/285 726/1 |
| 2016/0182566 | A1* | 6/2016 | Bean | H04L 63/20 726/22 |
| 2016/0204985 | A1* | 7/2016 | Mann | H04W 4/24 709/223 |
| 2016/0255105 | A1* | 9/2016 | Palazzo | H04L 63/1416 726/23 |
| 2016/0259780 | A1* | 9/2016 | Panemangalore | G06F 17/2264 |
| 2016/0260430 | A1* | 9/2016 | Panemangalore | G06F 17/289 |
| 2016/0301705 | A1* | 10/2016 | Higbee | G06F 16/35 |

OTHER PUBLICATIONS

Hadden et al., U.S. Appl. No. 14/792,129, filed Jul. 6, 2015.

BlackStratus SIEMStorm, "Rapidly identify and resolve threats, . . . " www.blackstratus.com, 2012. Four pages.

Domino Project Management, "Track and Control Projects with Lotus Notes," www.trackersuite.com/index, 2013. Two pages.

HP ArcSight Express, "World-Class Protection for the Mid-Size Organization," www.arcsight.com, 2010. Six pages.

Janet Csirt, "RTIR incident handling work-flow," Janet (UK) WI/JCSIRT/002, jisc.ac.uk, 2011. Eighteen pages.

Jarocki, J., "Orion Incident Response Live CD," 2010, Sans Institute, https://www.sans.org. Forty-five pages.

Khurana, H. et al., "Palantir: A Framework for Collaborative Incident Response and Investigation," IDtrust, 2009. Fourteen pages.

QRadar Administration Guide, http://www.q1labs.com, May 2012. 318 pages.

QRadar Users Guide, http://www.q1labs.com, May 2012. 396 pages.

Reddy, K. et al., "The architecture of a digital forensic readiness management system," Computers & Security 32 (2013) 73-89. Seventeen pages.

Swift, D., "A Practical Application of SIM/SEM/SIEM Automating Threat Identification," 2006, SANS Institute 2007. Forty-one pages.

West-Brown, M. et al., "Handbook for Computer Security Incident Response Teams (CSIRTs)," 2nd Edition, Apr. 2003. 223 pages.

* cited by examiner

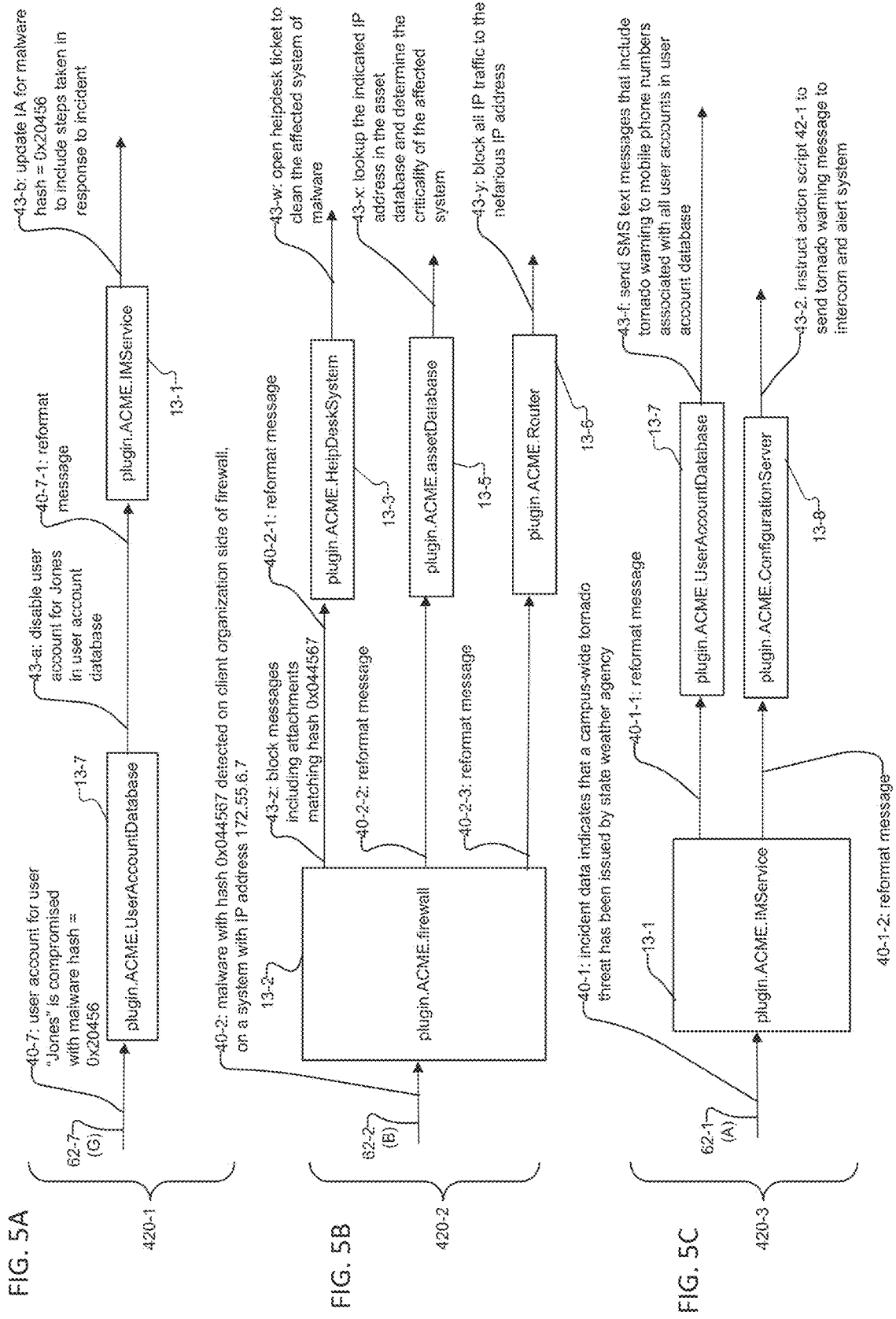

INCIDENT RESPONSE BUS FOR DATA SECURITY INCIDENTS

BACKGROUND OF THE INVENTION

Data security incidents pose a major operational and financial risk for business and government. In examples, data security incidents include loss of a physical asset, such as a company laptop computer, that contains company-confidential information and cyber attacks launched against systems and assets of a company's enterprise network.

Examples of cyber attacks include actions designed to disrupt normal business operations and intrusion attempts to steal information. Attacks that disrupt business operations include introduction of malware, computer viruses, and Denial of Service (DoS) attacks. The intrusion attempts use various methods to gain unauthorized access to personal information of individuals, and company confidential information such as customer lists and business plans. Attackers use methods that target security vulnerabilities in computer operating systems and software within the business' enterprise network to obtain unauthorized access.

Businesses use incident management systems to track and recommend responses to data security incidents in their enterprise computer networks. Current incident management systems and methods typically provide the ability for Incident Response Team (IRT) personnel to track how the institution is responding to incidents.

SUMMARY OF THE INVENTION

Current data incident management systems and methods have problems. Firstly, most incident management systems require IRT personnel to manually carry out actions in response to incidents by performing some action upon or by interacting with, or manipulating devices in the clients' enterprise networks. The devices must passively wait for IRT members to manually carry out the responses to incidents recommended by the incident management systems. This can create delay and can significantly impact the efficiency of responses to incidents. Moreover, the incident management systems that can execute actions in response to incidents directly upon the devices typically require significant configuration within each of the devices for communicating with the incident management systems. Although recently, incident management systems that provide an action response framework for tracking and reacting to data security incidents have been proposed. See "Action Response Framework for Data Security Incidents," U.S. Non-Provisional application Ser. No. 14/792,129 filed Jul. 6, 2015, which is incorporated herein by this reference in its entirety.

Nevertheless, network devices often have different application programming interfaces and employ different protocols and/or communications interfaces, such as devices supporting proprietary protocols and legacy devices supporting serial communications only.

The present invention provides an Incident Response Bus ("IR bus") within a client/server based action response framework that tracks data security incidents. The IR bus is preferably a centralized, protocol agnostic and device independent software component or service. The action response framework is included within an Incident Manager (IM) application or software service. The IR bus communicates with the IM on behalf of the devices and vice versa.

In response to events and conditions associated with data security incidents, or in response to explicit actions taken by IRT members within the IM, the IM includes information associated with the data security incidents in messages, and sends the messages to specific message queues of the messaging system. Message queues are also known as message destinations. The IR bus then acts as a proxy on behalf of the IM by accessing the messages in the message queues and coordinating the execution of specific logic or actions to be taken to interact with devices where the logic or actions preferably refer to the information concerning the data security incidents in the messages.

The IR bus typically includes a plugin software component for each device in the client's enterprise network with which the IM needs to interact. Each plugin defines device-specific interfacing and protocol support for communicating with the device associated with each plugin. In examples, each plugin can be a script written in a scripting language such as JavaScript, or a Java application. Java is a registered trademark of Oracle, Inc.

Some plugins are configured to poll for messages from specific message destinations and to download the messages. These plugins are designed and configured to implement specific logic, to interact with one or more devices to collect information or perform some remediation action, or to interact with other plugins. The same or other plugins may interact with information sources to collect additional contextual information about the data security incident (e.g. look up information about a user account thought to be involved in a security incident). The plugins refer to the information concerning the data security incidents in the downloaded messages.

Moreover, plugins can be configured together in a chain to process the messages and to implement complex functions and interactions in response to the data security incidents. The actions taken by a given plugin can be informed or affected by the results of previous plugins in the chain.

This provides an automated incident response capability. Additionally, IRT users can add plugins to the IR bus and associated message destinations to the IM that each plugin specifies to incrementally support new operations and devices. This provides an incident response capability that can scale with an increasing number of components within each client's enterprise network.

In one case, an incident management system has been proposed that enables communications between an incident manager that stores information concerning data security incidents and one or more information systems, where the information systems include additional information useful in the diagnosis or remediation of the data security incidents. These information systems, in one example, are threat intelligence source systems (TIS) that are located externally to the client's enterprise network. The TIS(s) include information concerning techniques, data resources (e.g. IP addresses or malware hashes) and identities of attackers involved in cyber attacks, in examples. See "System for Tracking Data Security Threats and Method for Same," U.S. Non-Provisional application Ser. No. 14/743,399 filed Jun. 18, 2015, which is incorporated herein by this reference in its entirety.

The IR bus of the present invention functions as a proxy to allow the IM to interact with information systems such as the TIS(s) disclosed in U.S. Non-Provisional application Ser. No. 14/743,399 referenced herein above, and functions as a proxy to allow the IM to interact with the various devices on the client's enterprise network. In one example, the plugins of the IR bus enable the IM to access the TIS information systems. In this model, the IM is the coordinator between and is central to interactions between the IM and the devices.

In general, according to one aspect, the invention features a system for responding to data security incidents in an enterprise network. The system includes devices responsible for security on the enterprise network, an incident manager that stores information concerning the data security incidents, and an incident response bus (IR bus) that communicates with the incident manager and the devices, where the IR bus accesses messages from the incident manager concerning the data security incidents.

In one example, each of the messages includes information associated with a specific data security incident. Preferably, the IR bus includes software plugin components for the devices, where the plugin software components specify actions for the devices to execute. Typically, the actions refer to the information concerning the data security incidents in the messages.

Preferably, the plugin software components define device-specific interfacing and protocol support for communicating with the devices, and poll for the messages from the incident manager. Moreover, at least some of the plugin software components are configured trigger actions on other devices via the plugin software components of those other devices.

Preferably, at least some of the plugin software components are configured together in a chain to implement complex functions and interactions in response to the data security incidents.

In yet another example, the system further comprises one or more information systems that include information useful in the diagnosis or remediation of the data security incidents. The incident response bus then allows the incident manager to interact with the one or more information systems.

In general, according to another aspect, the invention features a method for responding to data security incidents in an enterprise network. The method includes an incident manager storing information concerning the data security incidents, and an incident response bus communicating with the incident manager and with devices responsible for security on the enterprise network. The incident response bus then accesses messages concerning the data security incidents from the incident manager for the devices.

Preferably, the method configures at least some of the plugin software components together in a chain to process the messages concerning the data security incidents. The incident manager accesses, via the incident response bus, one or more information systems that include information useful in the diagnosis or remediation of the data security incidents.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 5A-5C show exemplary chains of plugins for carrying out responses to data security incidents on devices, where the plugins within the chains process the messages that include the information concerning the data security incidents and specify actions for the devices to execute, and where the actions refer to the information including the data security incidents extracted from the messages.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
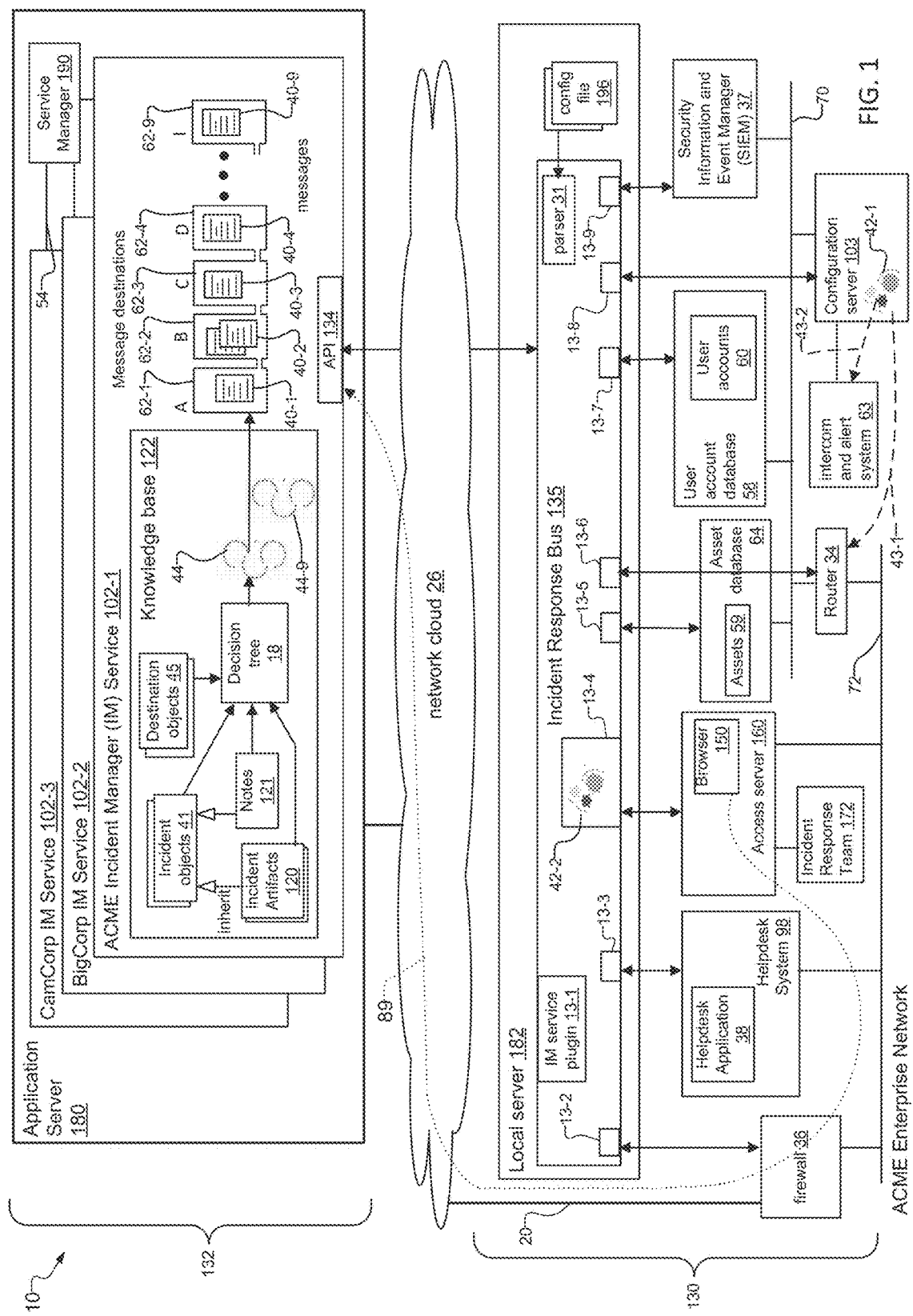
FIG. 1 is a block diagram showing an incident management system including an IR bus included within an enterprise network, where the system also includes a cloud based Incident Manager service (IM) that manages the response to data security incidents for multiple enterprise network clients, and where the IR bus communicates with its associated IM over a network cloud to access messages concerning the data security incidents, and where the IR bus then specifies actions for the devices to execute on behalf of the IM.

FIG. 1 is a block diagram showing an incident response system 10. The system 10 includes a service provider network 132 that communicates over a network cloud 26 with one or more enterprise networks 130 of business clients. The service provider network 132 includes an application server 180. In one implementation, the service provider network 132 and the enterprise network 130 may be one and the same.

The application server 180 includes a service manager 190 and one or more Incident Managers (IM) 102, which in turn include one or more message destinations 62. The message destinations 62 receive messages 40. The IMs 102, message destinations 62, and messages 40 form an incident response framework. Each of the message destinations 62-1 through 62-9, additionally labeled with references A through I, respectively, receive messages 40-1 through 40-9, respectfully. The message destinations 62 and messages 40 are implemented as a Java Messaging Service (JMS), in one example.

The JMS API allows applications to create, send, receive, and read messages using reliable, asynchronous, loosely coupled communications. The JMS API defines a common set of interfaces and associated semantics that allow programs written in the Java programming language to communicate with other messaging implementations. When using JMS, the sender and receiver need to know only which message format and which destination to use, as the JMS framework abstracts interface details of the senders and receivers.

Typically, a separate IM 102 is maintained for each enterprise client or customer 130. Each Incident Manager (IM) 102 is implemented preferably as a Software as a Service (SaaS) application. In one example, the service manager 190 sends management information 54 to update and maintain the IMs 102 for each of the separate customers of the entity that owns the application server 180.

Separate IMs 102-1, 102-2, and 102-3 are displayed for exemplary clients ACME Company, BigCorp, and CamCorp, respectively. The enterprise network 130 for ACME Company is included to show interactions between ACME's enterprise network and its associated IM 102-1. The IM 102 also includes a knowledge base 122 and an application programming interface (API) 134.

Within the IM 102, the knowledge base 122 stores information configured by the IRT 172 in response to incidents. This information includes details of the incidents, such as the incident data 20, and metadata associated with the incidents. The information is preferably received on the application programming interface 134, which forwards it to the knowledge base 122. The knowledge base 122 also includes a decision tree 18, destination objects 45, action conditions 44, incident objects 41, incident artifacts (IAs) 120, and notes 121.

The example enterprise network for ACME 130 includes exemplary appliances, devices, software and systems that communicate over a corporate network 70 and among one or more subnetworks 72. The subnetworks 72 are segmented from the corporate network 70 via a router 34. A firewall 36 is included on ACME's corporate network 70. Devices include firewall 36, Helpdesk System 98, access server 160, router 34, asset database 64, user account database 58, intercom and alert system 63, a Security Information and Event Manager (SIEM) 37, and a configuration server 103. The Helpdesk System 98 includes a Helpdesk Application 38 that logs events and supports creation of tickets for identifying issues in the enterprise network 130. Asset database 64 stores and maintains assets 59, such as for computer systems on ACME's enterprise network 130. The user account database 58 includes user accounts 60.

Some of the devices within the enterprise network 130 have limited interfacing and must rely on other devices to configure security related information. Devices that are not responsible for security on an enterprise network include the firewall 36, router 34, and intercom and alert system 63. Configuration server 103 includes one or more action scripts 42 that can interact with configuration server 103 to execute actions 43 on these devices. In a specific example, action script 42-1 executes action 43-1 on router 34 and action 43-2 on intercom and alert system 63.

Each enterprise network 130 also includes a local server 182. The local server 182 includes an incident response bus (IR bus) 135 and one or more config files 196. The IR bus 135 includes a parser 31 and plugins 13 associated with devices in ACME's enterprise network 130. In addition, plugins 13 can also be configured for and associated with software components within the local server 182 and within the application server 180. For example, plugin 13-1 is associated with the ACME IM 102-1 and is therefore referred to as an IM service plugin.

The IR bus 135 is preferably a centralized, protocol agnostic and device independent software component or service. The IR bus 135 communicates with its IM 102 and the devices and other components (e.g. hardware and/or software) via the plugins 13. Plugins 13-2 through 13-5 are associated with devices firewall 36, helpdesk system 98, access server 160, and asset database 64, respectively. Plugins 13-6 through 13-9 are associated with devices router 34, user account database 58, configuration server 103, and SIEM 37, respectively. Additionally, other plugins implement internal logic or transformations and do not directly execute actions on a specific device or system. In yet another example, the plugins 13 can be configured to connect to a specific message destination 62 and to download the messages 40 within each message destination 62.

The message destinations 62 and their messages 40 provide a loosely coupled communications path between the IM 102 and plugins 13 in the IR Bus 135. IRT personnel develop and design plugins to perform actions. When events associated with data security incidents satisfy action conditions 44, messages 40 are placed on message destinations 62. The messages 40 include information about the IM object involved in the data security incident. Those messages 40 are accessed by the associated plugin(s) 13 in the IR bus 135.

Plugins 13 then execute actions 43 based on their specific implementation. In some cases, those actions 43 will involve interacting with devices over the enterprise network 130. In other cases, those actions 43 will involve interacting with the IM 102 via an API 134. Plugins 13 can also be chained together to perform compound actions 43.

In the example, IRT users 172 configure an action condition 44-9, the satisfaction of which causes the IM 102 to send a message 40-9 to the defined message destination 62-9 within the action condition 44-9. Message 40-9 includes information associated with the data security incident that satisfied action condition 44-9. Plugin 13-9 associated with SIEM 37 is configured to monitor message destination 62-9.

Plugins 13 can also include action scripts 42. For example, plugin 13-4 includes action script 42-2 and incorporates the actions 43 of action script 42-2 with the actions 43 provided by plugin 13-4.

Plugin 13-9 polls message destination 62-9 and downloads messages 40-9. Plugin 13-9 extracts the information concerning the data security incidents in the message 40-9, and executes statements in the plugin 13-9 that refer to the information concerning the data security incidents. In this example, the statements within plugin 13-9 specify actions 43 for the SIEM 37 device to execute, where the actions refer to the information concerning the data security incidents extracted from message 40-9.

IRT personnel 172 use a browser 150 of access server 160 to configure the IM 102 via a graphical user interface API 134 of the IM 102. The communications path between the browser 150 and the IM 102, indicated by reference 89, does not utilize the IR bus 135 and its plugins 13. Via the browser 150, IRT 172 personnel create incident objects 41 within the IM 102 that include the incident data. This information can include the type of incident, such as "malware" or "phishing attempt," a time stamp and duration of an incident, serial numbers/internal asset identifiers of systems and resources affected by the incident, and data traffic traces taken during an incident using network protocol analyzers, in examples.

Additionally, IRT personnel 172 can append information to the existing incident objects 41, and can create IAs 120 and notes 121 associated with the incident objects 41 to enhance the information associated with the incident objects 41. In one example, IRT personnel 172 can append information directly to the incident objects 41, such as documenting the steps taken to resolve the incident. In another example, IAs 120 can be created, where IAs 120 include details related to the tactics, techniques, or procedures use by an attacker or other indicators of the attack. Examples of data resources include IP addresses of servers used to orchestrate the attack, "hashes" of malicious files used in the attack, or registry keys of "breadcrumbs" left behind as a result of an attack.

In other examples, the IM 102 itself can create the incident objects 41, artifacts 120, and notes 121 within the knowledge database 122 in response to receiving incident data 20.

Within the knowledge base 122, IRT personnel 172 also define action conditions 44. The action conditions 44 define criteria associated with incidents and data security events. The IM 102 continuously compares the contents of its incident objects 41, IAs 120, and/or notes 121 with the defined action conditions 44. Each action condition 44 also specifies the name/ID of a message destination 62. Action conditions 44 are also known as rules.

When the IM 102 detects data associated with incidents or state changes in incident objects 41, IAs 120, and/or notes 121 that satisfy/meet the conditions of the defined action conditions 44, the IM 102 includes information associated with the data security incidents that satisfied the action conditions 44 in messages 40, and sends the messages 40 to the message destinations 62 specified in the action conditions 44.

For configuring the IR bus 135 between the IM 102 and the devices, each plugin 13 specifies a unique identifier of an associated message destination 62. In one example, the unique identifier is a URL of the message destination 62. The IR bus 135, via its plugins 13, acts as a proxy on behalf of the IM 102 to communicate with the devices in each client's enterprise network 130. The plugins 13 download the messages 40 in the message destinations 62 specified within the plugins 13. The plugins 13 then execute their defined functionality, referencing the information from the message 40 as needed. In some cases, this will involve interacting with or manipulating devices over the enterprise network 130.

Figure 2:
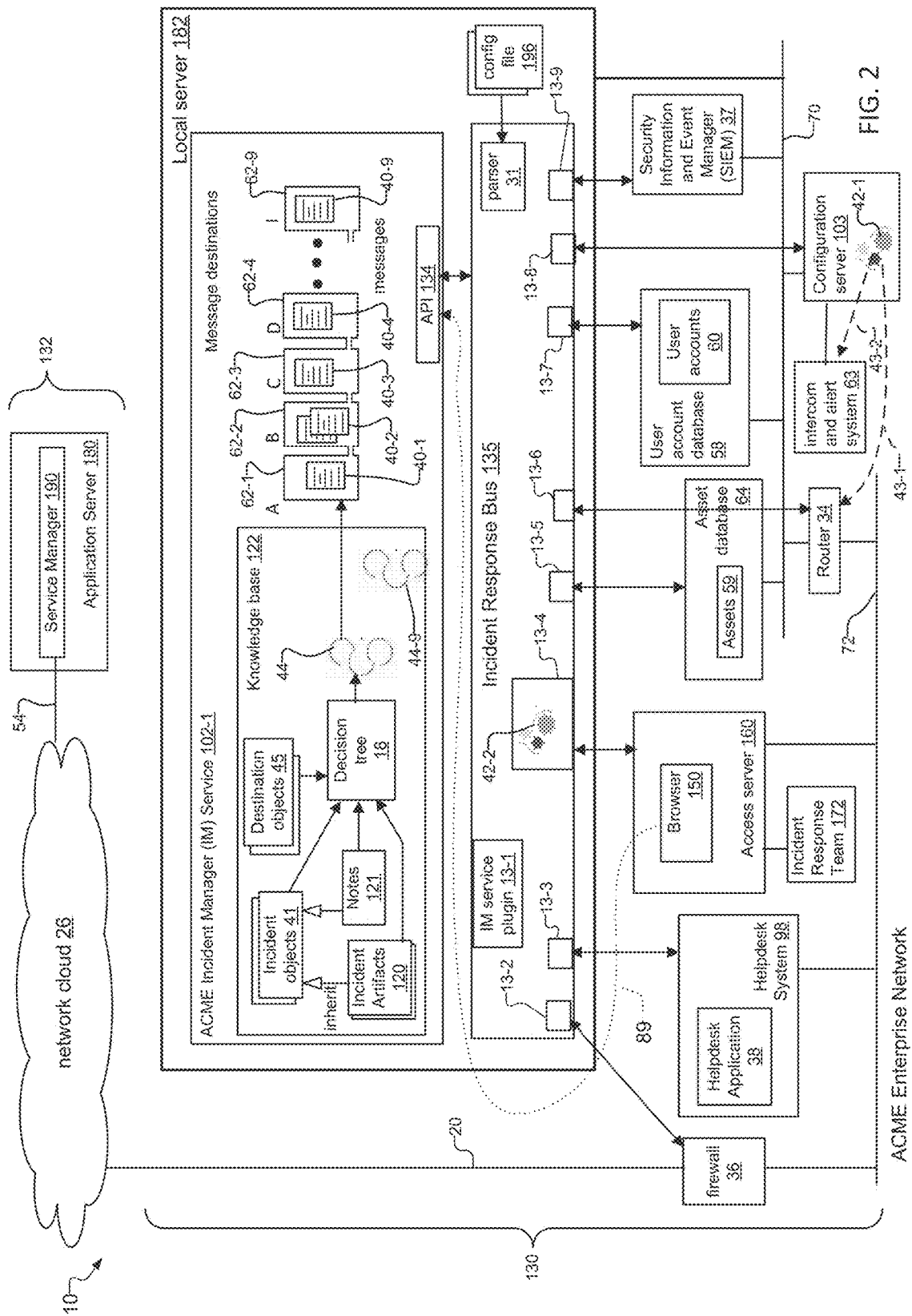
FIG. 2 is a block diagram showing a second incident management system, where the IM and the IR bus are both located within the client's enterprise network.

FIG. 2 shows a second embodiment of the incident response bus 135. The IR bus 135 and an "on premises" version of the IM 102 are included within the local server 182 of exemplary client ACME's enterprise network 130. Unlike the incident response bus 135 in FIG. 1, the IR bus 135 in FIG. 2 does not need to communicate with the IM 102 over network cloud 26. Instead, the IR bus 135 (e.g. each plugin 13 within the IR bus 135) can communicate directly with the IM 102 and message destinations 62 via a local connection.

Figure 3:
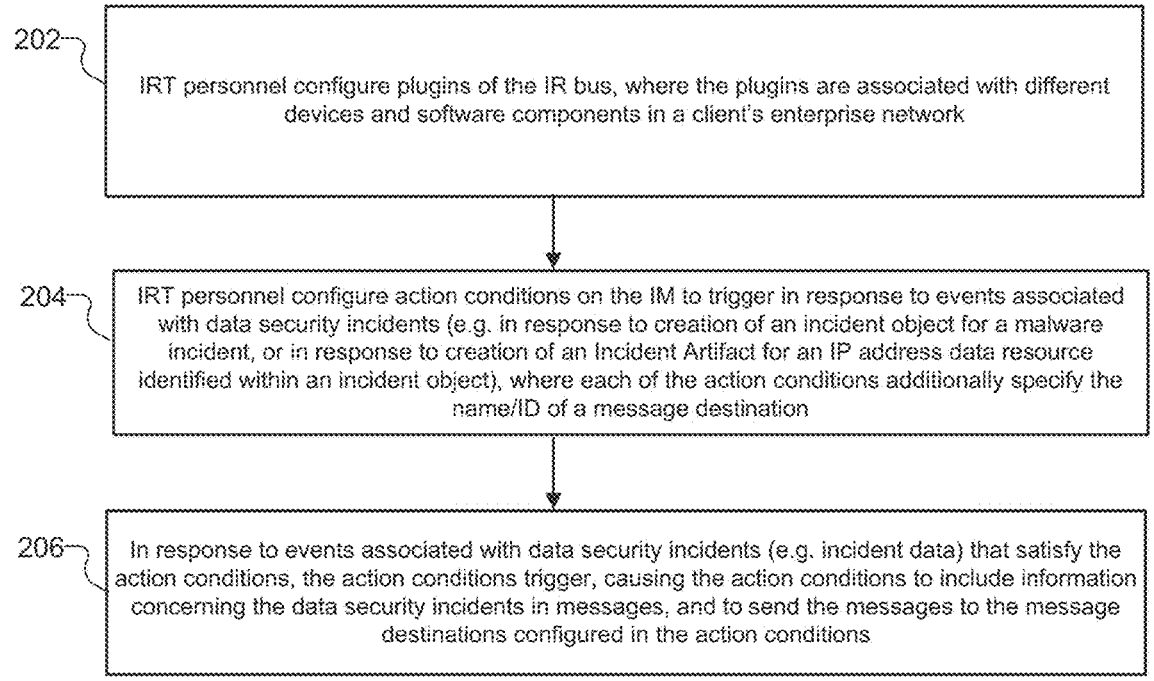
FIG. 3 is a flow chart that describes a method for configuring action conditions associated with data security incidents and for configuring plugins of the IR bus associated with different devices and software components.

FIG. 3 shows a method for configuring plugins 13 and action scripts 42. The plugins 13 and the action scripts 42 also specify actions 43 for devices to execute. In one example, the actions refer to information associated with data security incidents.

In step 202, IRT personnel 172 configure various plugins 13 of the IR bus 135, where the plugins 13 are associated with different devices and software components in a client's enterprise network 130. Preferably, the IRT personnel 172 configure the plugins 13 by modifying configuration (config) files 196 associated with the plugins 13. The config files 196 include configuration statements and associated logic for initializing and configuring the plugins 13. In one example, this configuration includes specifying the Universal Resource Locator (URL) of a specific message destination 62. In other examples, IRT personnel 172 configure parameters or other information within the plugins 13 to modify or specify optional behaviors of the plugins 13, provide URL(s) and other information required for the plugin to interact with the appropriate device or service, and provide authentication credentials required to connect to or interact with a message destination 62, device or service. In yet another example, IRT personnel 135 provide configuration data within the config files 196 which indicates how multiple plugins 13 should be chained together.

According to step 204, IRT 172 personnel configure action conditions 44 on the IM 102 to trigger in response to events associated with data security incidents (e.g. in response to creation of an incident object 41 for a malware incident, or in response to creation of an Incident Artifact 120 for an IP address data resource identified within an incident object 41), where each of the action conditions 44 additionally specify the name/ID of a message destination 62.

Then, in step 206, in response to events associated with data security incidents (e.g. incident data 20) that satisfy the action conditions 44, the action conditions trigger, causing the action conditions 44 to include information concerning the data security incidents in messages 40, and to send the messages 40 to the message destinations 62 configured in the action conditions 44.

Figure 4:
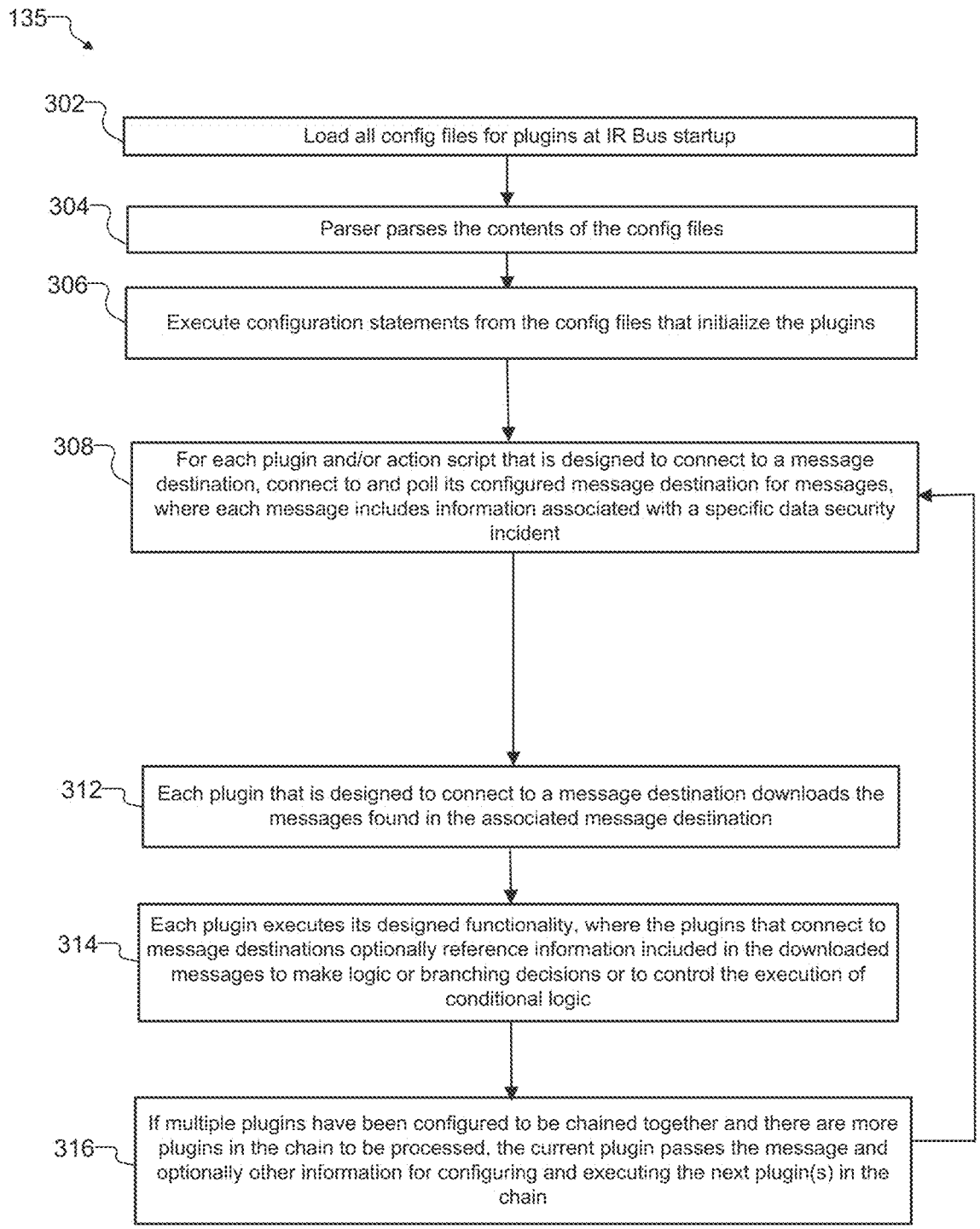
FIG. 4 is a flow chart that describes a method for how plugins in the IR bus carry out responses to data security incidents on devices associated with the plugins.

FIG. 4 shows a method for initializing the IR bus 135 and configuring its plugins 13.

In step 302, the IR bus 135 loads all config files 196 for plugins 13 at IR Bus 135 startup. In step 304, parser 31 parses the contents of the config files 196. Then, in step 306, the IR bus 135 executes configuration statements from the config files that initialize the plugins 13.

According to step 308, for each plugin 13 or action script 42 that is configured to connect to a message destination 62, the plugin 13 or action script 42 connects to its associated message destination 62 and polls the message destination 62 for messages 40. In a preferred embodiment, each of the messages 40 includes information associated with a specific data security incident.

In step 312, each plugin 13 that is designed to connect to a message destination 62 downloads the messages 40 found in the associated message destination 62. In step 314, each of the plugins 13 executes its designed functionality, where the plugins 13 that connect to the message destinations 62 optionally reference information included in the downloaded messages 40 to make logic or branching decisions or to control the execution of conditional logic. In examples, the designed functionality of the plugins 13 includes interacting with devices or services located in the enterprise network 130 or with remote devices and services over the network cloud 26.

Finally, in step 316, if multiple plugins 13 have been configured to be chained together and there are more plugins 13 in the chain 420 to be processed, the current plugin 13 passes the message 40 and optionally other information for configuring the next plugins 13 of the chain 420, which then execute. Then, the process flow continues by transitioning to step 308 for the execution of the next plugin(s) 13.

Preferably, chains 420 include one or more plugins 13 that communicate in a specific sequence, the statements of which can additionally define a format for the messages 40 received at each plugin 13.

FIGS. 5A-5C show exemplary chains 420-1 through 420-3, respectively that were configured by plugins 13. The chains 420 themselves include plugins 13 arranged in a sequence. The plugins 13 within the chains 420 process messages 40 that include information concerning data security incidents. The plugins 13 also specify actions 43 for the devices to execute, where the actions 43 optionally reference the information concerning the data security incidents in the messages.

FIG. 5A shows detail for exemplary chain 420-1. Chain 420-1 includes references to plugins 13-7 and 13-1.

In FIG. 5A, plugin 13-7 for user account database 58 polls message destination 62-7 for messages 40, and downloads message 40-7. Message 40-7 includes information associated with a malware data security incident, which indicates that user account 60 for user "Jones" has been compromised and the hash associated with the malware has value 0x20456.

In response, plugin 13-7 first executes action 43-$a$ to disable the user account 60 for user "Jones" in the user account database 58. Then, plugin 13-7 reformats the message, indicated by reference 40-7-1, to be in a format suitable for processing by the next plugin 13 in the chain 420-1, namely the IM service plugin 13-1. Plugin 13-1 executes action 43-$b$ to update the IA 120 for malware hash=0x20456 to include the steps taken in response to the incident.

FIG. 5B shows detail for exemplary chain 420-2. Chain 420-2 includes references to plugins 13-2, 13-3, 13-5, and 13-6.

In FIG. 5B, plugin 13-2 for firewall 36 polls message destination 62-2 for messages 40, and downloads message 40-2. Message 40-2 includes information associated with a malware data security incident of hash value=0x044567, and indicates the IP address of the affected system.

In response, plugin 13-2 first specifies action 43-$z$ for execution on firewall 36, to block messages 40 including attachments having a hash value that matches value 0x044567. Then, plugin 13-2 reformats the message, indicated by references 40-2-1, 40-2-2, and 40-2-3, to be in a format suitable for processing by the next plugins 13 in the chain 420-2. The next plugins 13 in chain 420-2 are the helpdesk system plugin 13-3, the asset database plugin 13-5, and the router plugin 13-6.

The helpdesk system plugin 13-3 specifies action 43-$w$ for execution on help desk system 98 to open a help desk ticket for cleaning the affected system of malware. The asset database plugin 13-5 specifies execution of action 43-$x$ on the asset database 64 to lookup the indicated IP address in the asset database 64 and to determine the criticality of the affected system. The router plugin 13-6 specifies execution of action 43-$y$ on router 34 to block all IP traffic to the nefarious IP address.

FIG. 5C shows detail for exemplary chain 420-3. Chain 420-3 includes references to plugins 13-1, 13-7, and 13-8.

In FIG. 5C, IM service plugin 13-1 polls message destination 62-1 for messages 40, and downloads message 40-1. Message 40-1 includes incident data which indicates that a campus wide tornado threat has been issued by the state weather agency.

In response, plugin 13-1 reformats the message, indicated by references 40-1-1 and 40-1-2, to be in a format suitable for processing by the next plugins 13 in the chain 420-3. The next plugins 13 in chain 420-3 are the user account database plugin 13-7 and the configuration server plugin 13-8. The user account database plugin 13-7 specifies execution of action 43-$f$ on the user account database 58, which sends SMS text messages that include the tornado warning to mobile phone numbers associated with all user accounts 60 in the user account database 58. The configuration server plugin 13-8 specifies execution of action 43-2 on the configuration server 103, which in turn instructs action script 42-1 to send the tornado warning message to the intercom and alert system 63.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for responding to data security incidents in an enterprise network having devices responsible for security on the enterprise network, the system comprising:
   an incident manager that stores information concerning the data security incidents; and
   an incident response bus that communicates with the incident manager and the devices, wherein the incident response bus accesses and processes messages from the incident manager concerning the data security incidents;
   wherein the incident response bus is protocol-agnostic and device-independent and has associated therewith a set of components, wherein a component in the set of components is associated with a particular device and defines device-specific interfacing and protocol support for enabling communication with the particular device associated with the component via the incident response bus;
   wherein processing messages from the incident manager includes obtaining a message, taking a first incident response action at a first component using the message, generating a modified version of the message, the modified version being in a format suited for processing by a second component, and taking a second incident response action associated with the first incident response action at the second component using the modified version of the message;
   the incident manager and the incident response bus implemented as software executable in one or more hardware processors.

2. The system as claimed in claim 1, wherein each of the messages includes information associated with a specific data security incident.

3. The system as claimed in claim 1, wherein the set of components associated with the incident response bus comprise plugin software components for the devices.

4. The system as claimed in claim 3, wherein the plugin software components specify actions for the devices to execute.

5. The system as claimed in claim 4, wherein the actions refer to information concerning data security incidents specified in the messages.

6. The system as claimed in claim 3, wherein the plugin software components poll for the messages from the incident manager.

7. The system as claimed in claim 3, wherein at least some of the plugin software components are configured to trigger actions on other devices via the plugin software components of those other devices.

8. The system as claimed in claim 3, wherein at least first and second of the plugin software components are configured together in a chain to respond to a data security incident, wherein the first plugin software component executes first and generates the modified version of the message and configuration data for the second plugin software component, the second plugin component using the modified version of the message and configuration data generated by the first plugin software component.

9. The system as claimed in claim 1, further comprising one or more information systems that include information useful in the diagnosis or remediation of the data security incidents.

10. The system as claimed in claim 9, wherein the incident manager interacts with the one or more information systems via the incident response bus.

11. A method for responding to data security incidents in an enterprise network having devices responsible for security on the enterprise network, the method comprising:
storing information concerning the data security incidents in an incident manager; and
communicating with the incident manager and with the devices responsible for security on the enterprise network via an incident response bus, the incident response bus accessing and processing messages concerning the data security incidents from the incident manager for the devices;
wherein the incident response bus is protocol-agnostic and device-independent and has associated therewith a set of components, wherein a component in the set of components is associated with a particular device and defines device-specific interfacing and protocol support for enabling communication with the particular device associated with the component via the incident response bus;
wherein processing messages from the incident manager includes obtaining a message, taking a first incident response action at a first component using the message, generating a modified version of the message, the modified version being in a format suited for processing by a second component, and taking a second incident response action associated with the first incident response action at the second component using the modified version of the message.

12. The method as claimed in claim 11, wherein each of the messages includes information associated with a specific data security incident.

13. The method as claimed in claim 11, further comprising configuring the set of components associated with the incident response bus as plugin software components that access the messages for the devices.

14. The method as claimed in claim 13, wherein the plugin software components specify actions to be taken by the devices.

15. The method as claimed in claim 14, wherein the actions refer to information concerning data security incidents specified in the messages.

16. The method as claimed in claim 13, further comprising using the plugin software components to trigger actions on other devices via the plugin software components of those other devices.

17. The method as claimed in claim 13, further comprising chaining at least some of the plugin software components together to process the messages concerning the data security incidents.

18. The method as claimed in claim 13, further comprising configuring at least first and second of the plugin software components together in a chain to respond to a data security incident, wherein the first plugin software component executes first and generates the modified version of the message and configuration data for the second plugin software component, the second plugin component using the modified version of the message and configuration data generated by the first plugin software component.

19. The method as claimed in claim 11, further comprising the incident manager accessing, via the incident response bus, one or more information systems that include information useful in the diagnosis or remediation of the data security incidents.

* * * * *